May 6, 1958        W. H. NEWELL        2,833,981
CONTROL FOR THREE VARIABLES
Filed April 13, 1955
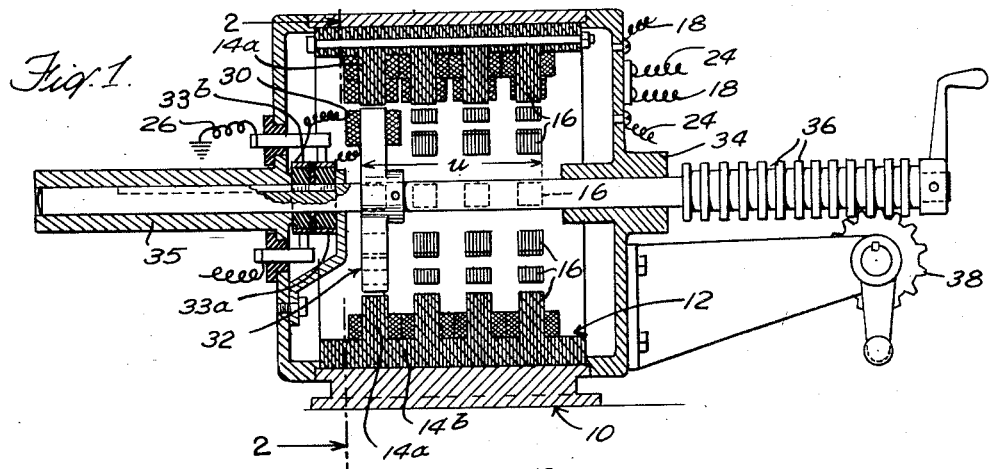
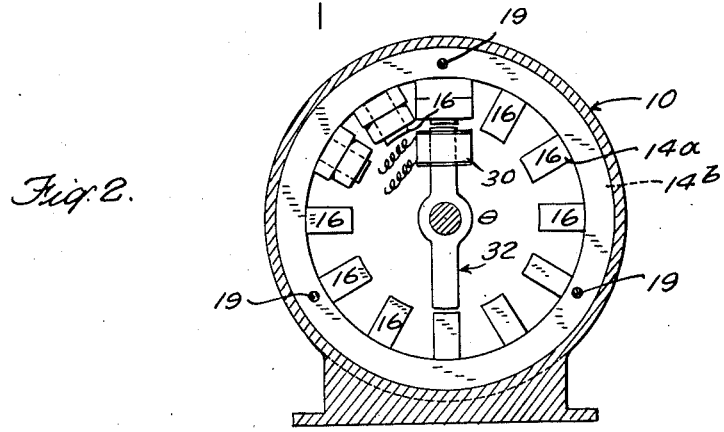
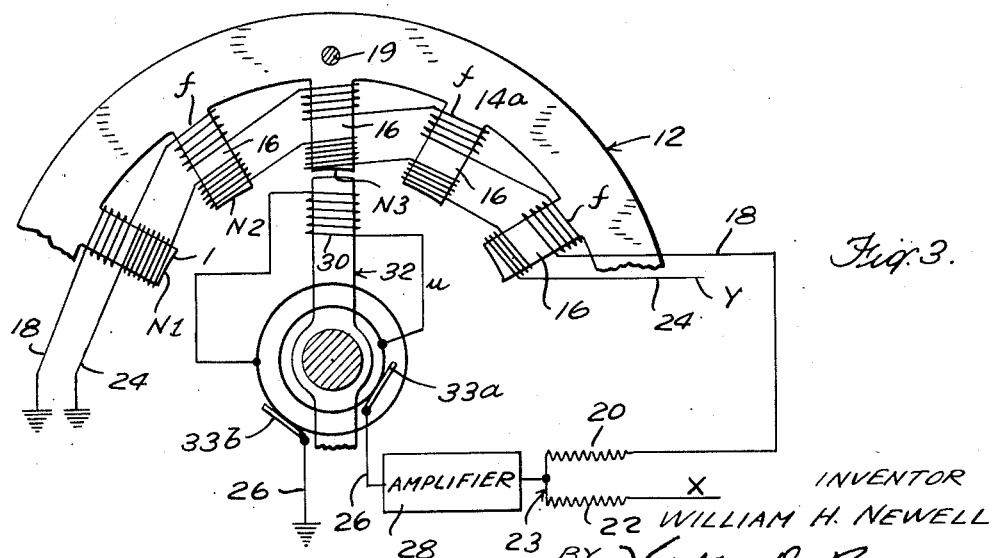
INVENTOR
WILLIAM H. NEWELL
BY Victor D. Borst
ATTORNEY

United States Patent Office 2,833,981
Patented May 6, 1958

2,833,981
CONTROL FOR THREE VARIABLES

William H. Newell, Mount Vernon, N. Y., assignor to Sperry Rand Corporation, a corporation of Delaware Application April 13, 1955, Serial No. 501,057

2 Claims. (Cl. 323—90)

This invention relates to a computer which is capable of producing an electrical voltage which is a function of at least two variables.

The device basically comprises a multiple pole stator with each pole piece distributed circumferentially and axially, a single pole rotor which can be aligned with any of the pole pieces and a voltage output circuit having windings inductively related to each stator pole piece and wound with a preselected number of turns on each pole piece. A source of exciting voltage is connected to a winding on the rotor which induces a voltage in the output. The value of the output will depend on the pole alignment of the rotor both rotatively and axially. It is accordingly seen that the output is a function of the rotor disposition in two planes. The poles are circumferentially and vertically spaced to permit interpolation in both directions.

Pick-up windings are placed on the stator pole pieces to serve as flux level standardizers and hence improve the accuracy of the output. These windings are series connected to the rotor circuit by means of a comparison network and the excitation current is established by a comparison of the reference voltage applied to the rotor circuit and the voltage induced pick-up windings. The circuit arrangement is such that any deviation causes an amplifier to change the excitation of the rotor so as to stabilized the flux level.

A third variable is introduced in the output by varying the flux level in the stator pole pieces and hence changing the induced voltage in the output. This variable may be a selected multiplier for the function.

The invention will be more fully set forth in the detailed description as illustrated in the accompanying drawings in which:

Fig. 1 is a longitudinal sectional view of the device;

Fig. 2 is a transverse section taken on the line 2—2 of Fig. 1; and

Fig. 3 is a diagrammatic illustration of the circuits used in my invention.

An object of the invention is to provide a device capable of solving a function, $Y=Xf(\theta, u)$, where $\theta$ and $u$ are variables and X is the value of a constant reference voltage, which may be varied so as to constitute a third variable, and Y is the particular function that the computer is designed to solve for any combination of preselected values for the independent variables.

The numeral 10 refers generally to a cylindrical housing in which there is disposed a stator 12 comprising a series of soft iron rings 14a and 14b the outside diameters of which conform substantially to the inner diameter of the housing. The rings are of two types. The inner diameters of rings 14a are identical to those of rings 14b except where the inner circumferences are interrupted by projecting cores or pole pieces 16 which are uniformly spaced about the circumference. A series of adjacent rings 14a placed coaxially together with the cores aligned comprise a polar set. As shown in Fig. 1 there are provided four polar sets which are spaced uniformly apart by a series of coaxial rings 14b which have a continuous inner circumference. The entire ring system comprises the laminated stator 12. Bolts 19 clamp the rings in position.

A flux standardizing circuit 18 having resistor 20 is connected to a plurality of pick-up windings $f$ of identical turns which are wound on each core 16. The resistor 20 is one resistor in a comparison network 23 which also includes a resistor 22 across which there is placed a reference voltage X. The voltage induced in the pick-up windings $f$ is employed to stabilize the flux level as explained below.

A grounded output circuit 24 is connected to the output Y and has a plurality of induction windings, $N_1$, $N_2$, $N_3$ . . ., similarly inductively related to the cores 16 and are series connected in circuit 24. Each induction winding is wound with a predetermined number of turns according to the desired value of the synthesized function for the particular combination of variables selected. As each core in effect represents a different combination of input variables, the voltage output Y in the circuit 24 will depend on the location of the flux producing means with respect to the cores.

A grounded input circuit 26 having a current regulating amplifier 28 is connected to the output of the comparison network. This circuit is provided with excitation winding 30 which is wound on rotor 32 and is the only exciting means. The current in the winding 30 is determined by a comparison of the reference voltage X in resistor 22 with the induced voltage across resistor 20 in the comparison network. Any deviation in the flux while the reference voltage is constant causes the amplifier 28 to effect a compensating change in the excitation current thus returning the flux level to its previous state.

The winding 30 is connected to the circuit 26 by input and output brush commutators 33a and 33b, respectively. The rotor 32 is mounted within the housing 10. The rotor is adapted to rotate in inductive proximity to the cores 16 of the stator and move axially in bearings 34 and 35 on a shaft which is coincident with the axial center line of the housing 10. The shaft of the rotor 32 has a series of annular grooves 36 which are adapted to engage a gear wheel 38 to impart axial movement to the rotor by means of a crank handle. Axial rotation of the shaft is similarly imparted by a crank handle mounted thereon as shown in Fig. 1.

The circumferential orientation of the rotor with respect to the stator represents the variable $\theta$ while the axial position of the rotor represents the variable $u$. The induced voltage in the output circuit 24 is a function of the circumferential and axial orientation of the rotor, and thus the variables $\theta$ and $u$, due to the preselected ampere turns of the induction windings to which the rotor field is proximate. The output voltage can also become a function of the reference voltage X since it is capable of changing the field flux and hence the induced voltage in output circuit 24.

The distance between poles can be chosen both circumferentially and axially to give good interpolation in these two directions. To this end it is expected that the pole pieces will be uniformly spaced.

It may be appreciated that the excitation currents may be produced in the stator with the output winding placed on the rotor. Other modifications may be effected by one skilled in the art without departing from the principles of invention and are therefore deemed to be within its scope as defined by the appended claims.

What is claimed is:

1. A mutual induction device having a variably controlled output comprising a source of exciting current, a stator having a plurality of circumferentially and axially distributed pole pieces, a rotor mounted to rotate in inductive proximity to said stator and to move axially thereof, an input circuit having an excitation winding inductively related to said rotor, said input circuit being connected to said current source, an output circuit having induction windings inductively related to the stator pole pieces, each of said induction windings having a predetermined number of turns, a flux standardizing circuit having pick-up windings series wound the same number of turns on each pole piece and a comparison network including a pair of resistors, one of said resistors being disposed in said flux standardizing circuit and the other being connected to said current source, the output of said comparison network being connected to said input circuit.

2. A mutual induction device having a variably controlled output as defined in claim 1 wherein an amplifier is inserted in said input circuit between the excitation winding and the comparison network and the stator pole pieces are uniformly spaced both axially and circumferentially to permit predictable interpolation by the rotor between adjacent stator pole pieces.

References Cited in the file of this patent

UNITED STATES PATENTS

| | | |
|---|---|---|
| 1,477,271 | Lowenstein | Dec. 11, 1923 |
| 1,522,742 | Parvin | Jan. 13, 1925 |
| 2,098,002 | Guerin et al. | Nov. 2, 1937 |
| 2,671,886 | Smith | Mar. 9, 1954 |